No. 803,536. PATENTED NOV. 7, 1905.
S. L. ALLEN.
AGRICULTURAL IMPLEMENT.
APPLICATION FILED FEB. 18, 1903.
4 SHEETS—SHEET 4.
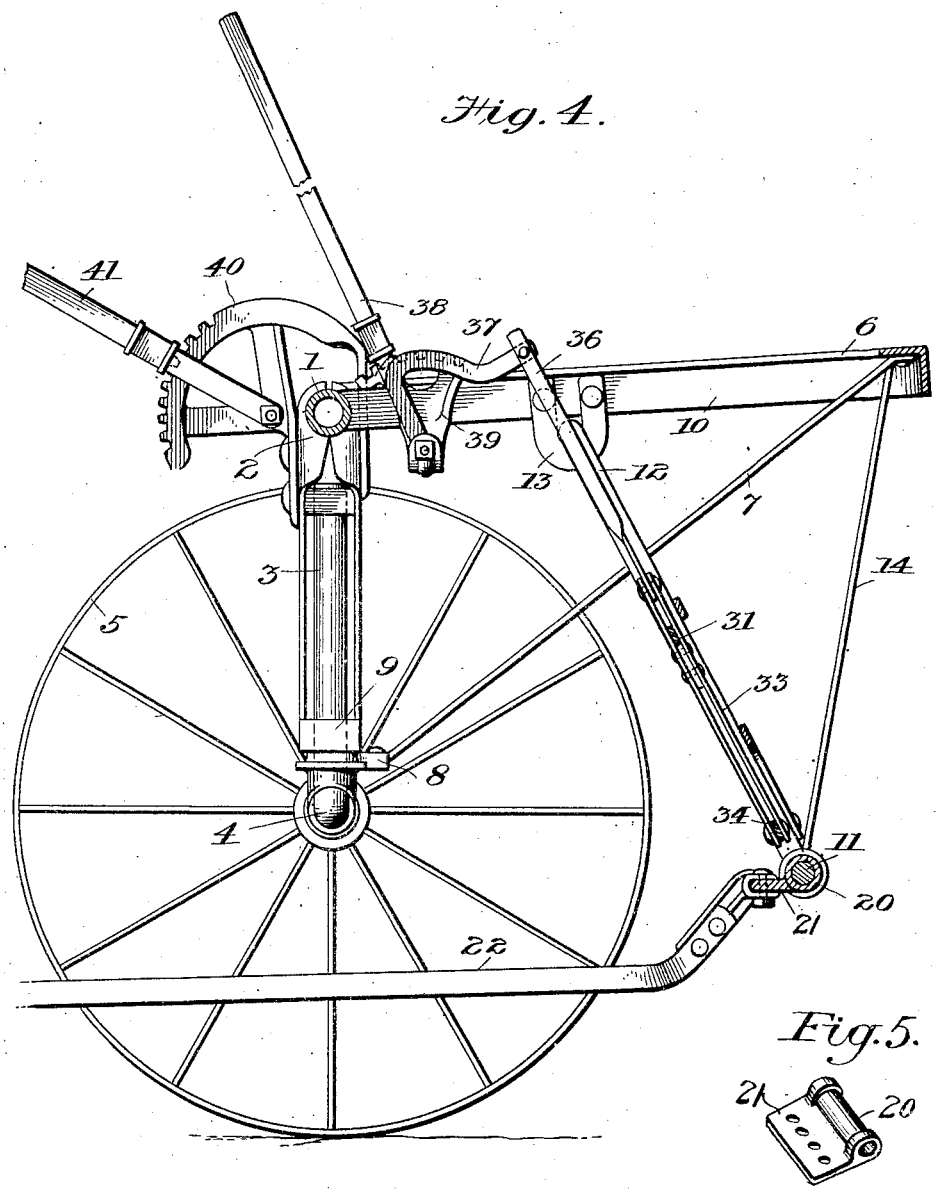
Fig. 4.
Fig. 5.
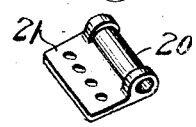
WITNESSES:
Jno. T. Cross.
Edw. W. Vaill Jr.
INVENTOR.
Samuel L. Allen,
by 
ATTORNEY.

UNITED STATES PATENT OFFICE.

SAMUEL L. ALLEN, OF MOORESTOWN, NEW JERSEY.

AGRICULTURAL IMPLEMENT.

No. 803,536.     Specification of Letters Patent.     Patented Nov. 7, 1905.

Application filed February 18, 1903. Serial No. 143,941.

*To all whom it may concern:*

Be it known that I, SAMUEL L. ALLEN, a citizen of the United States, and a resident of Moorestown, State of New Jersey, have invented certain new and useful Improvements in Agricultural Implements, of which the following is a full, clear, and exact description, reference being had to the accompanying drawings, forming part of this specification.

My invention relates to certain improvements in agricultural implements, and particularly to that class known as "double riding row cultivators."

The principal object of my invention is to provide an organized machine which is adapted to the cultivation of the soil in various kinds of crops and which has many uses and advantages both in its mode of operation and construction not heretofore existing in this class of agricultural implements.

Another object of my invention is to provide a novel construction of tool-carrying frame having mechanism for adjusting the width of the said frames during the operation of the machine, so as to bring the tools either closer to or farther away from the plants being worked in the event of the rows being uneven or varying in width.

A further object of my invention is to provide a lever mechanism for tilting the entire frame of the machine, which lever also serves to raise or lower the tongue, and in providing independent levers connecting with each of the tool-carrying frames for raising and lowering the same, which act in conjunction with the first-mentioned lever and serve to regulate the depth of the cut of the tools in the soil.

Further objects, uses, and advantages will be apparent on reference to the following description when taken in connection with the accompanying drawings.

Figure 1:
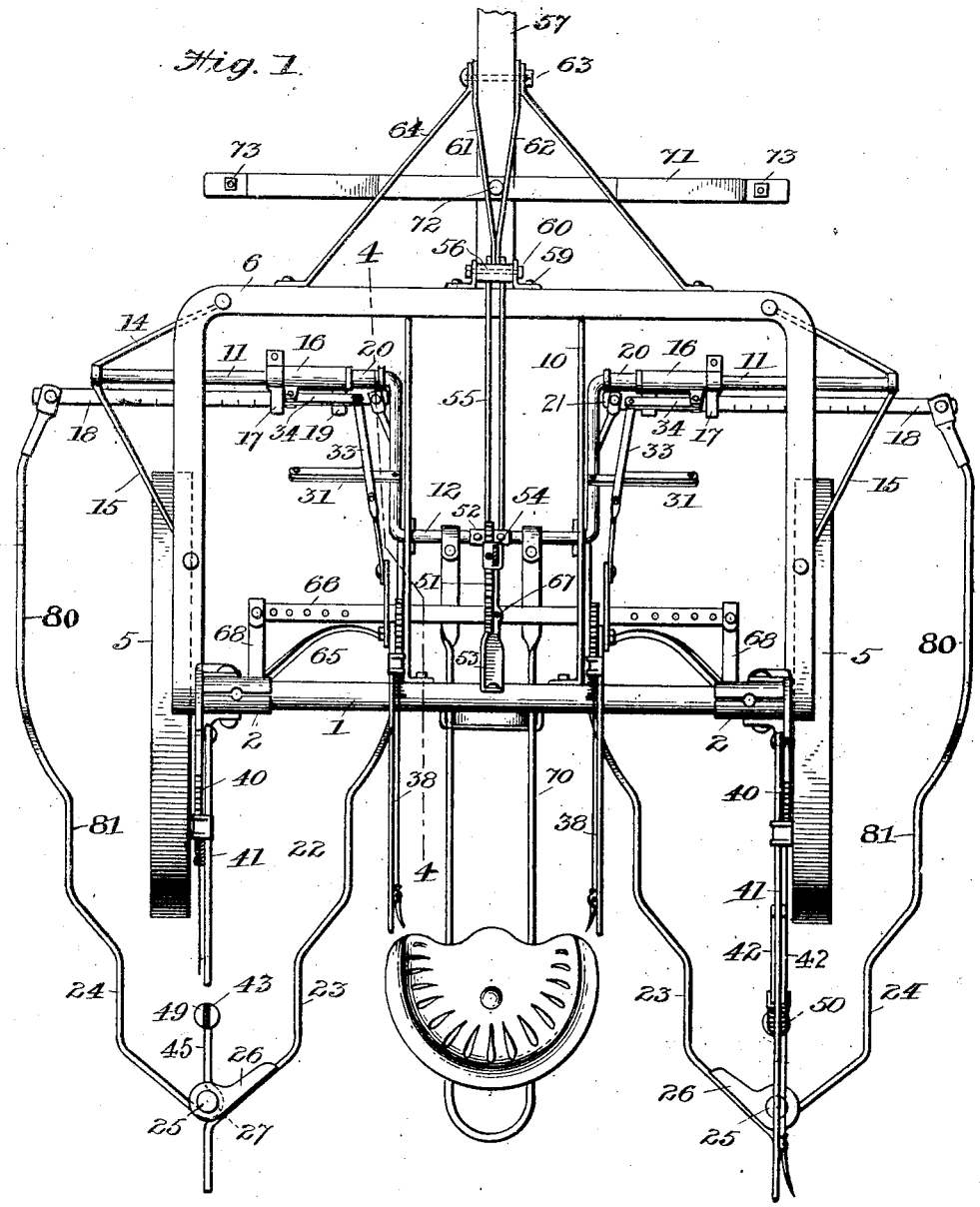
Figure 2:
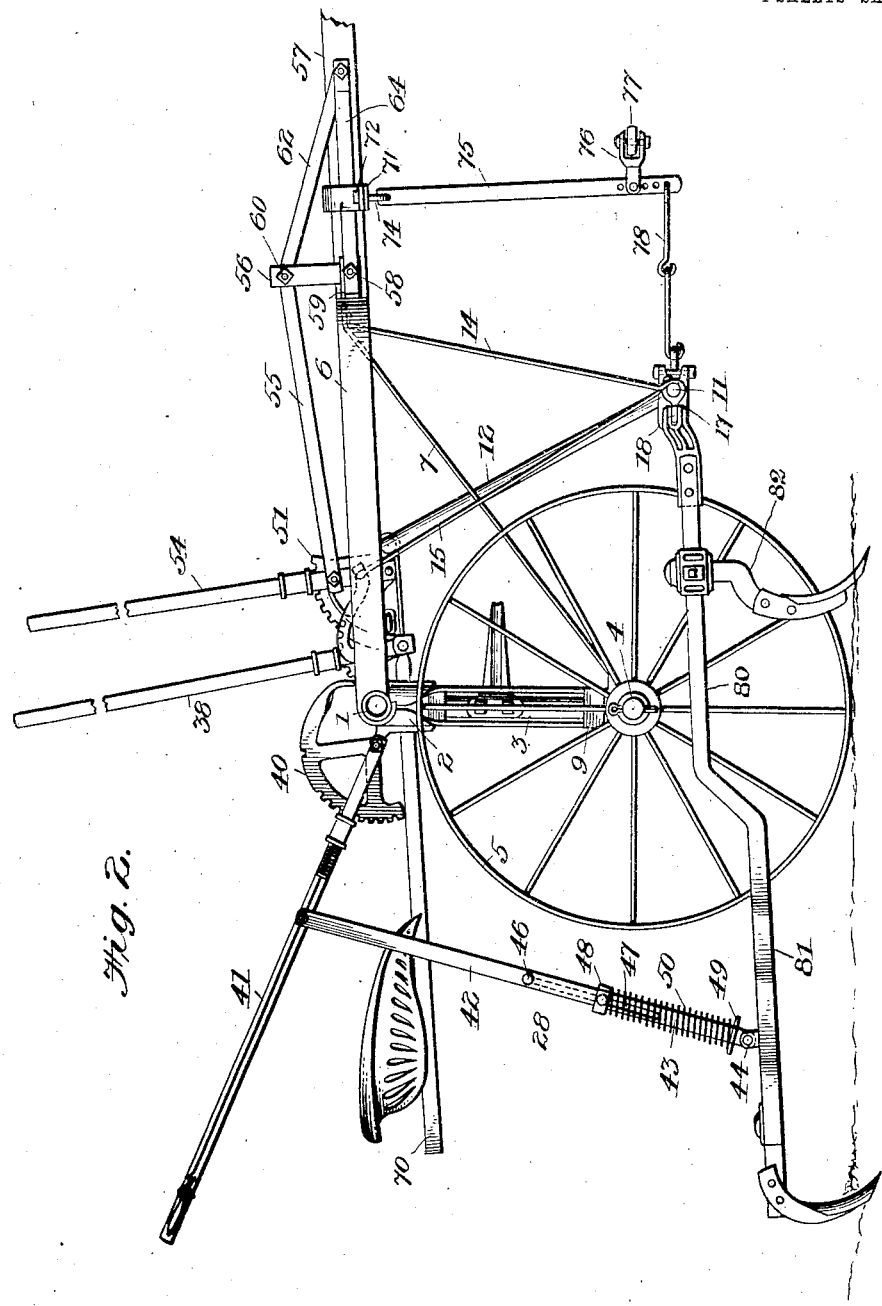
Figure 3:
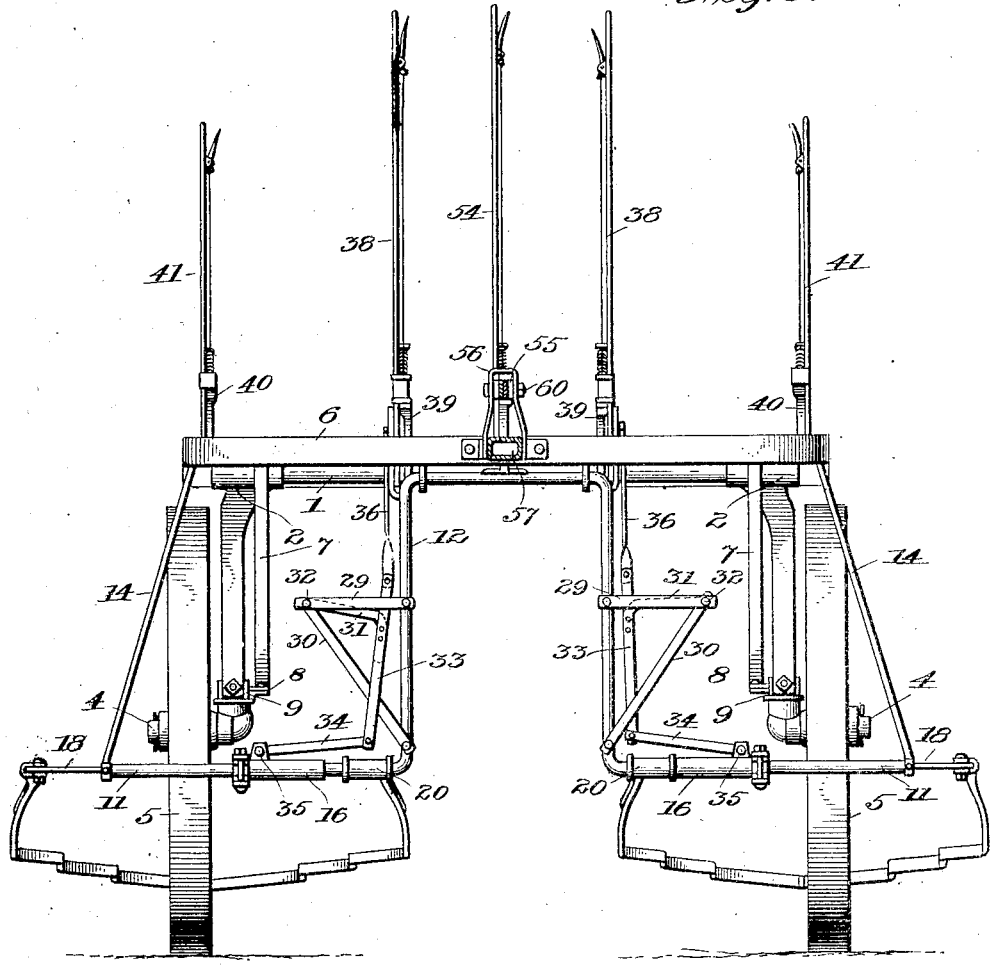

Referring to the accompanying drawings, in which similar reference-numerals are used to indicate like parts, Figure 1 is a plan view of a machine constructed in accordance with my invention. Fig. 2 is a side elevation of the same. Fig. 3 is a front view, and Fig. 4 is a sectional elevation taken about on the line 4 4 of Fig. 1. Fig. 5 is a perspective view of a detail.

In carrying out my invention I provide a supporting-frame comprising a transversely-disposed bar 1, which carries the clamps 2, in which are mounted the vertical pivot-bars 3, having their lower ends bent at substantially right angles to form axles 4 for the supporting-wheel 5. The clamps 2 are adjustable laterally on the frame-bar 1 for the purpose of adjusting the distances between the supporting-wheels of the machine.

Pivotally secured to each end of the frame-bar 1 is a U-shaped frame 6, preferably constructed of angle-iron or steel. This frame 6 is provided with two diagonally-disposed braces, as 7, which are riveted at one end to the front portion of the arched frame 6 and at their other ends to a lug 8, carried by the box 9, which is secured on the lower end of each of the pivot-bars 3. The U-shaped frame 6 is further braced by means of the bars 10, which are secured at their front ends to the forward part of the said frame and at their rear ends to the frame-bar 1.

In the forward part of the machine I provide a transversely-disposed frame-rod 11, having a yoke-shaped central portion 12, which extends upwardly and rearwardly and is secured to the under side of the brace-bars 10 by means of suitable clips, as shown at 13 in Fig. 4 of the drawings. The sections 11 of the frame-rod extend transversely to the machine, as shown most clearly in Fig. 1 of the drawings, and reach some distance beyond each side of the arched frame 6. A brace-rod 14 is connected to the outer ends of the rod 11 at their lower ends and at their upper ends to the under side of the front portion of the U-shaped frame 6. Another brace-rod, as 15, is secured at its lower end to the end of the rod 11 and runs rearwardly and upwardly and is secured at its upper end to the under portion of the side sections of the frame 6. These braces 14 and 15, together with the clips 13, serve to hold the frame-rod 11 12 securely in position on the main frame of the machine.

On each of the transversely-disposed sections 11 of the frame-rod I provide a sleeve 16, which is adapted to slide on said rods in the manner hereinafter described. This sleeve 16 carries a clamp 17, which projects from the rear of the rod 11 and supports and holds a bar 18, which runs substantially parallel with the frame-rod 11, as shown in Fig. 1 of the drawings. This bar 18 has its inner end passing through an eye 19, which is formed on the sleeve 16. At the inner portions of the transversely-disposed section 11 of the frame-rod I provide the collars 20, which have a projecting web or flange 21 extending from their rear portions and to which is secured one end of the hinged tool-carrying frames. The other side of the tool-carrying frame is pivoted at its forward end to the outer end of the bar 18. The tool-carrying frames are preferably constructed in the form illustrated in Fig. 1 of the drawings and comprise two independent side bars, as 23 and 24, which are hinged together at their rear ends by means of the bolt 25, which passes through a casting 26, secured to the side bar 23, and through an eye 27, formed in the end of the side bar 24. The side bars 23 and 24 of the tool-carrying frames are preferably constructed in the manner illustrated in Fig. 2 of the drawings. In this figure it will be noted that the forward section 80 of the side bars is elevated, so as to be in a plane above the rear section 81. The object of this construction is to permit the use of the high standard tooth, such as illustrated at 82 in Fig. 2. The end of the bar 24 extends a short distance in front of the eye 27 and is connected at this point by means of a rod 28, which is connected at its upper end to one of the levers for raising and lowering the tool-carrying frame, which will be described hereinafter.

Extending from the inclined yoke portion 12 of the front frame-rod is an arm 29, which is braced by means of the bar 30, which is connected to the outer end of the arm 29 at one end and to the frame-rod 12 at its other end in the manner shown most clearly in Fig. 3 of the drawings. A bell-crank lever 31 is fulcrumed at 32 to the arm 29 and has its other end rigidly secured to a lever 33, which has pivoted to its lower end a link 34, which link is pivoted at its other end to a lug 35, formed in the sleeve 16. The upper end of the bar 33 is pivoted to bar 36, which is in turn pivoted at its upper end to an arm 37, secured to the operating-lever 38. This operating-lever 38 is pivoted to the segmental rack 39, which is supported on the frame-bar 10, and is provided with the usual pawl mechanism, which is adapted to engage the teeth of the rack. From the above description it will be readily seen that upon operating the lever 38 the bell-crank lever 31 is actuated, and through the medium of the connecting-link 34 the sleeve 16 and clamp 17, which carries the bar 18, are moved laterally on the frame-rod 11, and by reason of the connection of the bar 18 with the outer side bar 24 of the tool-carrying frame the said tool-carrying frame may be adjusted at its forward end so as to accommodate any unevenness or deviation in the width of the rows of plants being cultivated. This adjustment can be effected during the operation of the machine by the operator, and when the outer side bars of the tool-frame are moved outwardly by the lever mechanism just described the hinged portion of the tool-carrying frame also moves in the same direction by only about one-half the distance of the front end of the side bar. This keeps the tool-carrying frame symmetrical at all times. The width of the forward portion of the tool-carrying frame can be further adjusted and regulated by releasing the clamp 17 and moving the bar 18 in or out, thus widening or narrowing the normal width of the said tool-carrying frame to accommodate rows of different widths. The inner side bar 23 of the tool-carrying frames is capable of a lateral adjustment, as the web or flange 21, carried by the collar 20, is provided with a number of bolt-holes in alinement in which the end of these side bars may be pivoted. The bar 18 is preferably provided on its upper face with a series of graduations, so that the said bar may be set according to the number of feet or inches between the rows.

Secured to the clamps 2, carried by the frame-bar 1, adjacent their outer ends are segmental racks 40, and pivoted to the segments are operating-levers 41, having the usual spring-pawls adapted to engage the teeth of the racks for holding the levers in their adjusted positions. Pivotally secured to the levers 41, on each side thereof, are the twin bars 42, which are connected to bars 43, having their lower ends pivoted to the clips 44, which are secured to the projecting ends 45, provided on the ends of the tool-carrying frames. The upper ends of the bars 43 pass between the twin bars 42 and are bolted thereto by means of the bolts 46, which pass through the said twin bars and through longitudinal slots 47, provided in the bars 43.

A clip 48 is bolted to the ends of the twin bars 42, and this bolt also passes through the slot 47. A collar or flange 49 is provided at the lower end of the bar 43 just above its pivotal connection to the clip 44, and interposed between this collar and the clip 48 is a coiled spring 50. The objects of the levers 41 are to raise and lower the tool-carrying frames and hold them in their adjusted positions, and the springs 50 serve to keep the teeth carried by each tool-carrying frame in the ground under tension and at the same time allow the said frame to yield upwardly in the event of the tools or teeth striking against stones or other obstructions. The depth of the cut into the soil may be readily adjusted by the operator by pushing the lever downwardly, where it may be held in such adjusted position by the rack-and-pawl mechanism provided. The tool-carrying frames can also be lifted so as to bring the teeth entirely clear of the ground by raising the lever 41, as will be readily understood.

In the center of the machine between the two bars 10 I provide a segmental rack 51, which is secured in position by means of a foot-piece 52, adapted to rest and be bolted to the upper yoke portion of the frame-rod 12 at one end and having its rear end provided with an extension 53, which is bolted to the frame-bar 1. A lever 54 is fulcrumed to the segment 51, which is provided with the usual spring-pawl adapted to engage the teeth of the rack. Pivoted on each side of the lever 54 are the twin bars 55, which extend toward the front of the machine and are pivoted to a stirrup 56, which has its free ends bolted to the tongue 57 by means of a pivot-bolt 58. This bolt 58 also passes through the angle-irons 59, which are secured to the front part of the arched frame 6, as illustrated in Figs. 1 and 3 of the drawings. Pivoted between the two bars 55 by the bolt 60 are the bars 61 and 62, which extend forwardly and are inclined downwardly, where they are bolted at 63 to the tongue 57. The brace-bars 64 are also provided, which are connected at their front ends to the tongue by the bolt 63 and have their rear ends secured to the arched frame 6.

By the above-described arrangement of levers the operator, through the medium of the lever 54, can raise or lower the tongue of the machine. When the lever 54 is moved rearwardly, the entire supporting-frame of the machine is tilted, which action raises the front end of the tool-frames and also lowers or tilts the rear ends of the said frames. Consequently this lever 54 acts in conjunction with side levers to regulate the depth of penetration of the tools into the soil.

The wheel-pivots 3 have secured to their inner sides the foot-rests 65, by means of which the operator may turn the said pivots to steer the course of the machine. The two vertical pivots 3 are connected together by means of a bar 66, which extends transversely across the machine and is pivoted in its center by a pin 67, passing through an eyelet formed on the lower portion of the segment 51. At each end of the bar 66 is pivoted a rod 68, which is connected at its other end to the vertical wheel-pivot 3, so that when the operator pushes one of the foot-rests 65 to turn the supporting-wheel at an angle the connection between the two pivot-bars will serve to turn the opposite wheel at a similar angle.

The seat-frame 70 comprises two parallel bars secured at their front ends to the yoke portion of the frame-rod 12 and having their intermediate portions secured in any suitable manner to the frame-bar 1.

The draft mechanism of my machine may be described as follows: a doubletree 71, composed of two metal bars, the upper one of which passes over the top of the tongue and the lower one passing under the bottom of the tongue, the two said bars being pivotally connected to the tongue by means of the bolt 72 and having their ends bolted together, as shown in Fig. 2 of the drawings. The end bolts 73, provided in the doubletree, terminate in hooks or staples, as 74, to which is connected a vertically-swinging bar 75, having a series of apertures provided in its lower end, to which may be connected the clevis 76, which carries a swingletree 77. The end of the bar 75 is connected, by means of links or a chain, as 78, to an eye formed on the sleeves 16, carried by the frame-rods 11. By such a construction the draft of the machine is equalized in a very efficient manner.

In the operation of my machine the tool-carrying frames are first adjusted at their forward ends to suit the width of the rows to be worked by loosening up the clamp 17 and adjusting the bar 18 laterally, which adjustment moves the outer side bar 24 of each tool-carrying frame laterally. The inner side bar 23 of each frame may be adjusted by removing the connecting-bolt provided in the end of said side bar and placing it in a different hole provided in the web or flange formed on the collar 20. After these adjustments have been made the operator can increase or diminish the width of the tool-carrying frame by operating the levers 38. These levers 38 are each independent of the other and are connected to the sleeve 16, carried by the transversely-disposed frame-rod 11, by means of the bell-crank mechanism heretofore described. The operation of either of these levers moves the outer side bars of the tool-carrying frame either in or out, so that any deviation in the width of a row may be accommodated and the teeth be made to work the same distance from the plant throughout the entire length of said rows.

By means of the independent levers 41, provided on each side of the machine and having connection with the tool-carrying frames, each of these said tool-carrying frames can be adjusted relatively to the soil, so as to obtain the proper depth of penetration of the tools independently of each other, as before described. The levers 41 also serve as a lifting means for raising the tool-carrying frames and their tools out of contact with the soil during transportation from the field. The central lever 54 serves to raise or lower the tongue of the machine and also serves to tilt the main supporting-frame and wheel-pivots, which action necessarily raises the front portion of each tool-carrying frame and lowers the rear portion of said frame. Therefore the said central lever may be said to act in conjunction with the side levers 41 for regulating the depth of penetration of the tools into the soil.

It will be noted that the peculiar combination and arrangement of the various parts of this machine adapt it to various kinds of work in the cultivation of crops and render it operative under all conditions of soil.

The machine is also very simple in its construction and inexpensive to manufacture, and at the same time the movements are all positive, and the machine is extremely strong and durable.

I do not wish to be limited to the exact details of construction herein illustrated, but hold that various slight changes may be made without departing from the spirit and scope of my invention.

Having thus described my invention, what I claim, and desire to secure by Letters Patent, is—

1. In an agricultural implement, substantially triangular tool-carrying frames, tools carried by two sides of said frame, said sides being pivoted at their apices and levers having connection with one of said sides of each frame for varying the widths of said frames during the operation of the machine.

2. In an agricultural implement, a main supporting-frame, a tool-carrying frame comprising two sections hinged together at one end, means for supporting the other ends of said frames on the main frame, and a lever having connection with said frame for increasing or diminishing the width of each tool-carrying frame during the operation of the machine.

3. In an agricultural implement, a main frame adapted to carry the supporting-wheels, tool-carrying frames comprising side bars hinged together at one end and surrounding the supporting-wheels, means for supporting the front ends of each tool-frame on the main frame, and levers connected with one of said bars of each frame for increasing or diminishing the width of the said tool-carrying frames during the operation of the machine.

4. In combination, a main frame adapted to carry the supporting-wheels, a substantially triangular tool-carrying frame comprising side bars hinged together at their rear ends, a stationary pivotal connection between one of said side bars and the supporting-frame, and a movable pivotal connection between the other side bar and the supporting-frame, for the purpose described.

5. In combination, a main frame, a tool-frame comprising side bars hinged together at their rear ends, a stationary pivotal connection between one of said side bars and the supporting-frame, a movable pivotal connection between the other side bar and the supporting-frame, and mechanism for imparting lateral movement to this side bar, for the purpose described.

6. In combination with the supporting-frame, a tool-frame comprising two side bars hinged together at their rear ends, the said side bars being spread at their front ends, a fixed pivoted connection for the front end of one side bar, and means for moving the other side bar laterally to increase the width of the tool-frame, substantially as described.

7. In combination, a main supporting-frame, a tool-frame comprising two side bars hinged together at their rear ends, a stationary pivoted connection between the front end of one side bar and the supporting-frame, a laterally-movable slide carried by the supporting-frame, a pivoted connection between the other side bar and the said slide and means for moving the said slide laterally, for the purpose described.

8. In combination, a main supporting-frame adapted to carry the wheels, tool-carrying frames hinged at their rear ends and adapted to surround the wheels, a transversely-disposed bar carried by the main frame, a slide arranged on said bar, connections between said slide and one of the side bars of the tool-carrying frame, and means within the control of the operator for moving the said slide to adjust the width of the tool-carrying frames.

9. In combination, a main frame adapted to carry the supporting-wheels, tool-carrying frames comprising two sections hinged together at their rear ends, a transversely-disposed bar supported in the forward portion of the main frame, a slide carried by said bar, a bar adjustably connected to said slide, having its outer end connected to the outer side bar of the tool-carrying frame, and means within the control of the operator for moving the slide for adjusting the width of the tool-frame.

10. In combination, a main frame adapted to carry the supporting-wheels, a transversely-disposed frame-rod supported on the main frame in the forward portion of the machine, tool-carrying frames hinged at their rear ends and adapted to surround the wheels, a slide carried by the transversely-disposed frame-bars, a bar adjustably connected at one end to the slide and having its outer end connected to the outer side bar of the tool-carrying frame, lever mechanism connected with the slide on the transverse frame-rod and an operating-handle connected to the lever mechanism for the purpose described.

11. The combination with the main frame, of a transversely-disposed frame supported on the main frame, collars rigidly secured on the transverse frame-bar, tool-carrying frames hinged at their rear ends having their inner side bars pivoted to the collars on the frame-rods, slides loosely mounted on the said bars rigidly connected at their inner ends to the said slides and extending outwardly substantially parallel to the frame-rod having their outer ends pivotally connected to the outer side of the tool-carrying frames, lever mechanism carried by the supporting-frame, and operating-lever connected to said lever mechanism, substantially as described.

12. In combination, a main supporting-frame, transversely-disposed frame-bar carried by the main frame having an arch in its central portion, rigid collars carried by the lower portions of the said frame-bar, slides arranged on said frame-bar, laterally-extending bars secured to the said slides, means for adjusting the said bars, tool-carrying frames comprising two sections hinged at their rear ends having their inner side bars pivoted to the collars carried by the frame-rods and having their outer side bars pivotally connected to the adjustable bars carried by the slides, and lever mechanism for moving the slides to increase or diminish the width of the tool-carrying frames, substantially as described.

13. In combination with the supporting-frame and wheels a pivoted tool-carrying frame comprising side bars pivoted to the main frame at one end, the said side bars being elevated at their forward ends above the plane of their rear portions, for the purpose substantially as described.

14. The combination with the wheel-pivots, pivot-bars, a transverse frame-bar for supporting the pivot-bars, a substantially U-shaped frame having its end connected to the said frame-bar adjacent its ends, and braces connecting the pivot-bars and the U-shaped frame, substantially as described.

15. The combination with the wheel-pivots of a main supporting-frame comprising a transverse bar, clamping devices carried by said bar in which the wheel-pivots are swiveled, a substantially U-shaped frame extending forwardly from said bar having its ends secured thereto, brace-rods connecting the wheel-pivots and the U-shaped frame and intermediate braces connecting the transverse frame-bar and the front section of the U-shaped bar, substantially as described.

16. The combination with the main frame, the pivot-bars swiveled therein, tool-carrying frames pivotally mounted on the main frame, operating-levers having connections with the tool-frames, operating-levers for each tool-frame for regulating the width of said frames, and a lever for tilting the entire supporting-frame, for the purpose substantially as described.

17. A pivot-wheel riding-cultivator comprising in combination, a main frame, a lever mechanism for tilting the same, a pair of tool-supporting frames, a lever mechanism for raising and lowering each tool-frame, and lever mechanism connected with each tool-frame whereby the sides of either of said frames may be adjusted during the operation of the machine to suit the width of the rows, substantially as described.

In witness whereof I have hereunto set my hand this 17th day of February, A. D. 1903.

SAMUEL L. ALLEN.

Witnesses:
JOHN F. GRADY,
HOMER PETIT.